United States Patent
Yu et al.

(10) Patent No.: US 9,391,511 B2
(45) Date of Patent: Jul. 12, 2016

(54) FAST RESPONSE CONTROL CIRCUIT AND CONTROL METHOD THEREOF

(71) Applicant: Silergy Semiconductor Technology (Hangzhou) LTD, Hangzhou, ZheJiang Province (CN)

(72) Inventors: Feng Yu, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 249 days.

(21) Appl. No.: 14/104,606

(22) Filed: Dec. 12, 2013

(65) Prior Publication Data
US 2014/0176107 A1 Jun. 26, 2014

(30) Foreign Application Priority Data
Dec. 20, 2012 (CN) .......................... 2012 1 0560203

(51) Int. Cl.
*H02M 3/156* (2006.01)
*H02M 1/00* (2006.01)

(52) U.S. Cl.
CPC ...... *H02M 3/156* (2013.01); *H02M 2001/0009* (2013.01); *H02M 2001/0025* (2013.01); *H02M 2003/1566* (2013.01)

(58) Field of Classification Search
CPC .............. H02M 2003/1566; H02M 2001/003; H02M 2001/0025; H02M 2001/0019
See application file for complete search history.

(56) References Cited

U.S. PATENT DOCUMENTS

| | | | |
|---|---|---|---|
| 7,012,411 B2 | 3/2006 | Yasukouchi | |
| 7,768,346 B1 * | 8/2010 | Terrovitis | H03G 3/3042 330/129 |
| 8,587,968 B2 | 11/2013 | Zhu et al. | |
| 2002/0057125 A1 * | 5/2002 | Demizu | H02M 3/156 327/538 |
| 2005/0088159 A1 * | 4/2005 | Itohara | H02M 3/156 323/284 |
| 2006/0176098 A1 * | 8/2006 | Chen | H02M 3/156 327/341 |
| 2013/0043849 A1 * | 2/2013 | Pagano | H02M 3/156 323/271 |
| 2013/0148387 A1 | 6/2013 | Ren et al. | |
| 2014/0320102 A1 * | 10/2014 | Ali | H02M 3/10 323/284 |

FOREIGN PATENT DOCUMENTS

CN 102707757 A 10/2012

\* cited by examiner

*Primary Examiner* — Harry Behm
(74) *Attorney, Agent, or Firm* — Michael C. Stephens, Jr.

(57) ABSTRACT

In one embodiment, a control circuit configured to control a switch mode power supply, can include: (i) a compensation signal generating circuit configured to generate a compensation signal according to an error between an output voltage feedback signal and a first reference voltage of the switch mode power supply; (ii) a switching signal generating circuit configured to control a switching operation of a power switching device of the switch mode power supply according to the compensation signal; (iii) a judge circuit configured to determine an operation state of the switch mode power supply according to the output voltage feedback signal; and (iv) a loop gain regulating circuit configured to regulate a loop gain of the control circuit according to the operation state.

18 Claims, 7 Drawing Sheets

[a]

[b]

FAST RESPONSE CONTROL CIRCUIT AND CONTROL METHOD THEREOF

RELATED APPLICATIONS

This application claims the benefit of Chinese Patent Application No. 201210560203.7, filed on Dec. 20, 2012, which is incorporated herein by reference in its entirety.

FIELD OF THE INVENTION

The present invention relates to a switch mode power supply, and more particularly to a fast response control circuit and a method of controlling the switch mode power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a control circuit configured to control a switch mode power supply, can include: (i) a compensation signal generating circuit configured to generate a compensation signal according to an error between an output voltage feedback signal and a first reference voltage of the switch mode power supply; (ii) a switching signal generating circuit configured to control a switching operation of a power switching device of the switch mode power supply according to the compensation signal; (iii) a judge circuit configured to determine an operation state of the switch mode power supply according to the output voltage feedback signal; and (iv) a loop gain regulating circuit configured to regulate a loop gain of the control circuit according to the operation state.

In one embodiment, a method of controlling a switch mode power supply, can include: (i) generating a compensation signal according to an error between an output voltage feedback signal and a first reference voltage of the switch mode power supply; (ii) controlling a switching operation of a power switching device of the switch mode power supply according to the compensation signal; (iii) detecting an operation state of the switch mode power supply according to the output voltage feedback signal; and (iv) regulating a loop gain according to the operation state of the switch mode power supply.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switch mode power supply can include a power stage circuit and a control circuit. The control circuit can regulate the turning on and turning off time of a switch system in the power stage circuit when an input voltage, operating parameters, and/or an external load are changing, so as to maintain an output voltage and/or an output current of the switch mode power supply as substantially constant. A switch mode power supply can generally be controlled via fixed-frequency control or variable frequency control.

Figure 1:
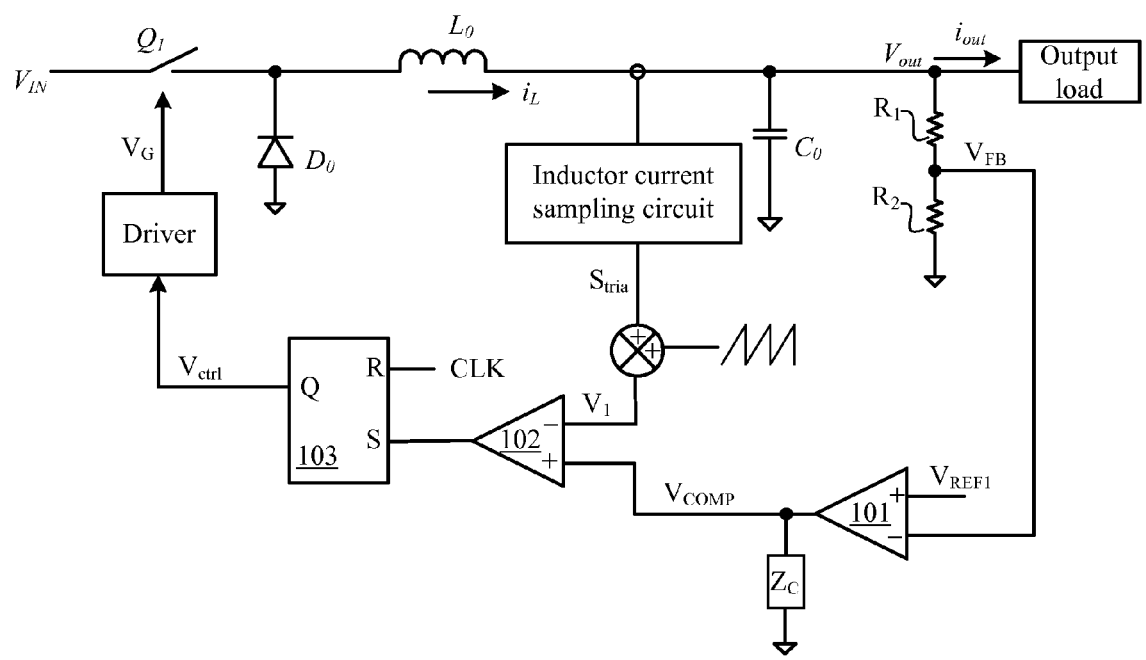
FIG. 1 is a block diagram of an example switch mode power supply with fixed-frequency control.

FIG. 1 shows a block diagram of an example control circuit for a switch mode power supply with fixed-frequency control. An inductor current sampling circuit can be utilized to output triangular wave signal $S_{tria}$ for indicating the inductor current information. Control signal $V_1$ can be obtained by adding triangle wave signal $S_{tria}$ with a ramp signal. Compensation signal $V_{comp}$ can be obtained by compensating the output signal of error amplifier 101 through compensation loop $Z_c$. For example, the output signal of error amplifier 101 can be generated according to output voltage feedback signal $V_{FB}$ and reference voltage $V_{REF1}$, and reference voltage $V_{REF1}$ can represent an expected output voltage. Comparator 102 can compare control signal $V_1$ against compensation signal $V_{comp}$, and may control the turning on of switch $Q_1$ in the switch mode power supply according to the comparison result. Also, the turning off of switch $Q_1$ can be controlled by using fixed-frequency clock signal CLK (e.g., at a rising edge of CLK).

From the above operation/procedure, whatever the operation state of the switch mode power supply, the loop gain of the control circuit can remain substantially unchanged. When the switch mode power supply is in a steady state, the control effect cannot be influenced. However, when the load changes suddenly (e.g., in a transient or dynamic situation), the response speed of the switch mode power supply may need to be improved, so as to perform a transient procedure as soon as possible to recover the system to the steady state. By increasing the loop gain of the control circuit, the dynamic response procedure can be accelerated, and the steady margin of the system, or the time it takes to return the system to a steady operation state, can be reduced.

In one embodiment, a control circuit configured to control a switch mode power supply, can include: (i) a compensation signal generating circuit configured to generate a compensation signal according to an error between an output voltage feedback signal and a first reference voltage of the switch mode power supply; (ii) a switching signal generating circuit configured to control a switching operation of a power switching device of the switch mode power supply according to the compensation signal; (iii) a judge circuit configured to determine an operation state of the switch mode power supply according to the output voltage feedback signal; and (iv) a loop gain regulating circuit configured to regulate a loop gain of the control circuit according to the operation state.

Figure 2:
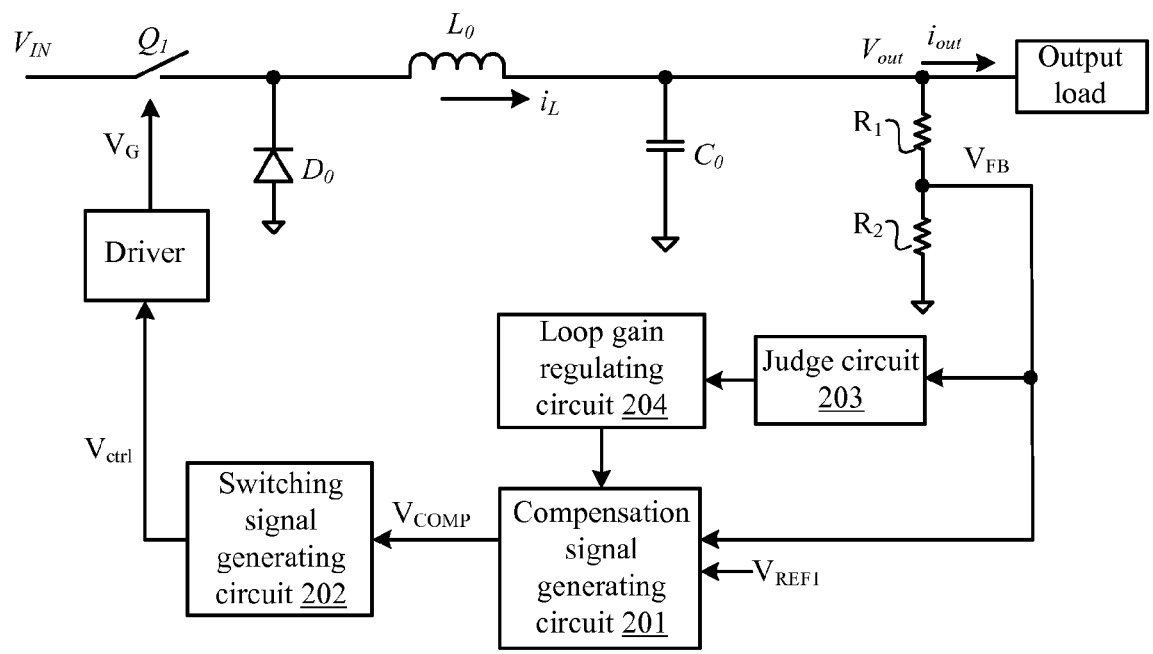
FIG. 2 is a block diagram of a first example control circuit in accordance with embodiments of the present invention.

Referring now to FIG. 2, shown is a block diagram of a first example control circuit in accordance with embodiments of the present invention. In this example, a buck-type switch mode power supply is shown. However, any suitable power supply structure or topology (e.g., flyback, boost, SEPIC, buck-boost, etc.) can be supported in particular embodiments. Here, power switching device $Q_1$ (e.g., a transistor), diode $D_0$, inductor $L_0$, and output capacitor $C_0$ can form a buck topology power stage circuit. An input terminal of the power stage circuit can receive input voltage $V_{IN}$, and the converted power can be supplied to the output load via output voltage $V_{out}$ and/or output current $i_{out}$.

The control circuit can include compensation signal generating circuit 201, switching signal generating circuit 202, judge circuit 203, and loop gain regulating circuit 204. Also, a voltage dividing resistor loop can be formed by resistor $R_1$ and resistor $R_2$ series connected between output voltage $V_{out}$ and ground. The voltage dividing resistor loop can be configured as a voltage feedback circuit for receiving output voltage $V_{out}$ at the output terminal, and generating output voltage feedback signal $V_{FB}$ that indicates output voltage information at a common node of resistor $R_1$ and resistor $R_2$.

Compensation signal generating circuit 201 can receive output voltage feedback signal $V_{FB}$ and reference voltage $V_{REF1}$ that represents an expected output voltage. Compensation signal generating circuit 201 can generate compensation signal $V_{COMP}$ according to or based on an error between output voltage feedback signal $V_{FB}$ and reference voltage $V_{REF1}$. Switching signal generating circuit 202 can receive compensation signal $V_{COMP}$, and may accordingly control a switching operation (turn on/turn off) of power switching device $Q_1$ (e.g., a transistor) of the switch mode power supply.

Judge circuit 203 can detect an operation state of the switch mode power supply according to output voltage feedback signal $V_{FB}$. For example, output voltage feedback signal $V_{FB}$ can be compared against one or more threshold signals (e.g., threshold voltage levels) via judge circuit 203 to determine whether the switch mode power supply is in a first operation state (e.g., a steady operation state) or a second operation state (e.g., a dynamic response operation state). Also, loop gain regulating circuit 204 can regulate the loop gain of the control circuit according to the judgment result or output of judge circuit 203.

For example, when judge circuit 203 detects that the switch mode power supply is operating in the first operation state, the loop gain regulating circuit may stop operating or be disabled such that the loop gain remains unaffected (or not adjusted by loop gain regulating circuit 204). Also, when judge circuit 203 detects that the switch mode power supply is operating in the second operation state, the loop gain regulating circuit can be enabled and may adjust the loop gain (e.g., increase the loop gain) by changing the gain of compensation signal generating circuit 201. In this way, the response speed of the control circuit can be improved such that the switch mode power supply can more quickly adjust to the dynamic or transient change in the output load.

The control circuit can detect the operation state (e.g., steady operation state or dynamic response state) of the switch mode power supply, and may regulate the loop gain of the control circuit according to the detected operation state. The loop gain can be maintained as is, and the steady margin can be prevented from being affected by the control circuit, when in a steady operation state. Further, the loop gain can be increased to increase the loop bandwidth, in order to accelerate the dynamic response speed, when the switch mode power supply is in a dynamic response state and needs to quickly adjust to changing conditions (e.g., output load transients). Also, those skilled in the art will recognize that output voltage feedback signal $V_{FB}$ of FIG. 2 can be obtained in any suitable way (e.g., current sensing, voltage sensing, etc.).

Figure 3:
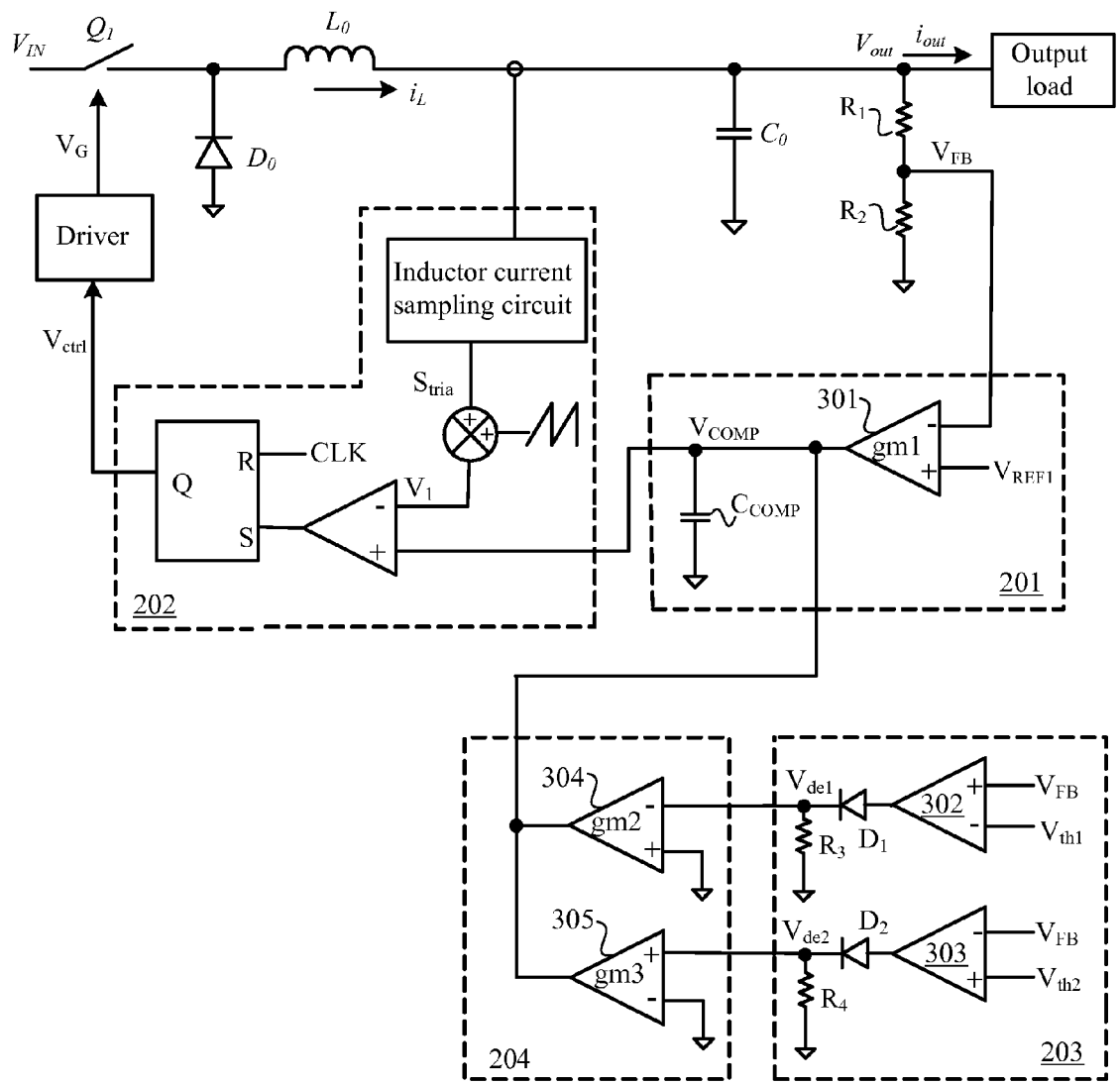
FIG. 3 is a block diagram of a second example control circuit in accordance with embodiments of the present invention.

Referring now to FIG. 3, shown is a schematic block diagram of a second example control circuit in accordance with embodiments of the present invention. For example, compensation signal generating circuit 201 can employ transconductance amplifier 301 to output current according to an error between output voltage feedback signal $V_{FB}$ and reference voltage $V_{REF1}$. Compensation signal generating circuit 201 can generate compensation signal $V_{COMP}$ by charging and/or discharging compensation capacitor $C_{COMP}$ in the compensation loop. For example, the compensation loop can additionally or alternatively be formed by a series connected compensation capacitor and resistor.

Switch signal generating circuit 202 can receive compensation signal $V_{COMP}$, and may output control signal $V_{ctrl}$ to control power switching device $Q_1$ according to detected inductor current information. Power switching device $Q_1$ can be directly driven switch through a driver that receives control signal $V_{ctrl}$. Comparator 302 in judge circuit 203 can receive output voltage feedback signal $V_{FB}$ and threshold signal $V_{th1}$. For example, threshold signal $V_{th1}$ can be a level greater than reference voltage $V_{REF1}$ (e.g., threshold signal $V_{th1}$ can be about 102% of $V_{REF1}$). An output from comparator 302 can be converted to judge signal $V_{de1}$ on resistor $R_3$ via diode $D_1$. The inverting input of comparator 303 can receive output voltage feedback signal $V_{FB}$, and the non-inverting input can receive threshold signal $V_{th2}$. For example, threshold signal $V_{th2}$ can be a level less than reference voltage $V_{REF1}$ (e.g., threshold signal $V_{th2}$ can be about 98% of $V_{REF1}$). The output of comparator 303 can form judge signal $V_{de2}$ on resistor $R_4$ via diode $D_2$.

Loop gain regulating circuit 204 can include transconductance amplifier 304 and transconductance amplifier 305. For example, transconductance amplifier 304 can receive judge signal $V_{de1}$, and a non-inverting input can connect to ground. Transconductance amplifier 305 can receive signal $V_{de2}$, and an inverting input can connect to ground. The outputs of transconductance amplifiers 304 and 305 can be connected together and to the output of transconductance amplifier 301 in compensation signal generating circuit 201.

When output voltage feedback signal $V_{FB}$ is in an interval (e.g., a voltage interval) formed by threshold signal $V_{th1}$ and threshold signal $V_{th2}$, the switch mode power supply can be detected as in a steady operation state (e.g., the "first" operation state or mode). In this case, judge signal $V_{de1}$ and judge signal $V_{de2}$ can both be inactive low. Thus, the outputs of transconductance amplifiers 304 and 305 may not output current, and loop gain regulating circuit 204 can effectively be disabled or may otherwise stop operating, and may not affect the loop gain. Therefore, the gain of the compensation signal generating circuit 201 may not be affected by loop gain regulating circuit 204 during the first operation state.

When output voltage feedback signal $V_{FB}$ is greater than threshold signal $V_{th1}$ or less than threshold signal $V_{th2}$, the switch mode power supply can be detected as in a dynamic response state (e.g., the "second" operation state or mode). In this case, judge signal $V_{de1}$ or judge signal $V_{de2}$ can be active high. Thus, the output of transconductance amplifier 304 can further increase the discharging current of compensation capacitor $C_{COMP}$. Or, transconductance amplifier 305 can output a forward current to increase the charging current of compensation capacitor $C_{COMP}$. In this way, the gain of compensation signal generating circuit 201 can accordingly be increased by loop gain regulating circuit 204, resulting in an increase of the gain of the full control loop.

Figure 4:
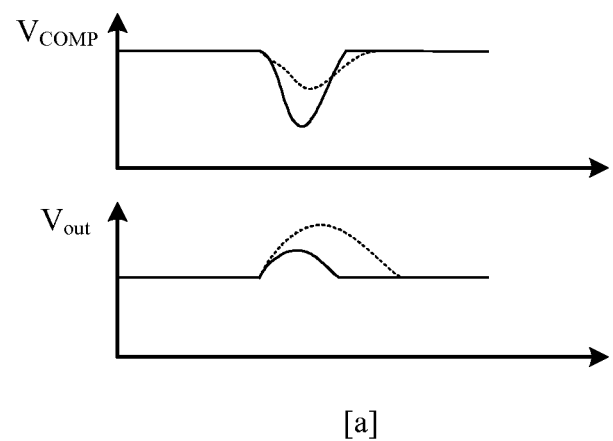
FIG. 4 is an example operation waveform diagram for the control circuit of FIG. 3.
Figure 4:
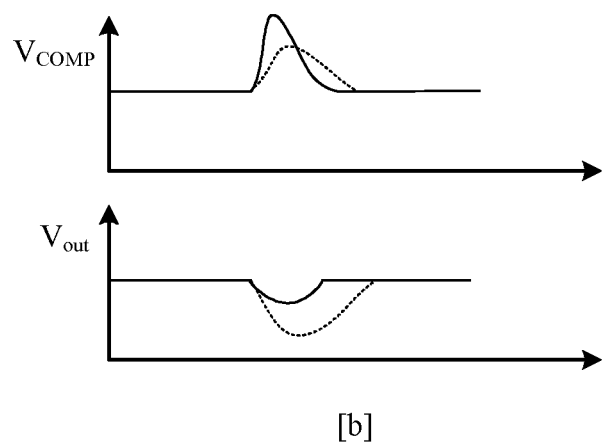

Referring now to FIG. 4, shown is a waveform diagram showing example operation of compensation signal $V_{COMP}$, output voltage $V_{out}$ for the example circuit of FIG. 3. Here, the solid lines can be example waveforms of the control circuit of particular embodiments, and the dashed lines can be representative waveforms (e.g., of a conventional control circuit). From the comparison, when output voltage feedback signal $V_{FB}$ is greater than threshold signal $V_{th1}$ (as shown in graph [a]), or less than threshold signal $V_{th2}$ (as shown in graph [b]), in the control circuit of particular embodiments, because the gain of the compensation signal generating circuit is changed, the changing rate of compensation signal $V_{COMP}$ is much faster. In addition, the regulating speed of the switch duty cycle can also be increased, thus increasing a return and regulation of output voltage $V_{out}$ to the steady operation state.

In the particular example of FIG. 3, the switch mode power supply can employ fixed-frequency control, where clock signal CLK with fixed-frequency can be used to control the turning off of switch $Q_1$. Therefore, when the load changes suddenly in a transient or dynamic response situation, the system may not respond until the next clock signal arrives. However, since the system is in the second operation state (dynamic response) in this case, if loop gain regulating circuit 204 increases the loop gain too much, the loop bandwidth can be accordingly increased, and the system can effectively wind up switching between the first and second operation states.

In order to address this potential problem, the fast response control circuit of particular embodiments can also include a switch period regulating circuit to control the switch period of switch $Q_1$ to change along with output voltage feedback signal $V_{FB}$. Specifically, the switch period regulating circuit can be realized by changing the frequency of clock signal CLK in switching signal generating circuit 202. The following will describe one particular example implementation for generating a variable clock signal CLK to regulate the switch period, in conjunction with the circuit shown in FIG. 5. To facilitate the description, FIG. 5 only shows the switch period regulating circuit for generating clock signal CLK.

Figure 5:
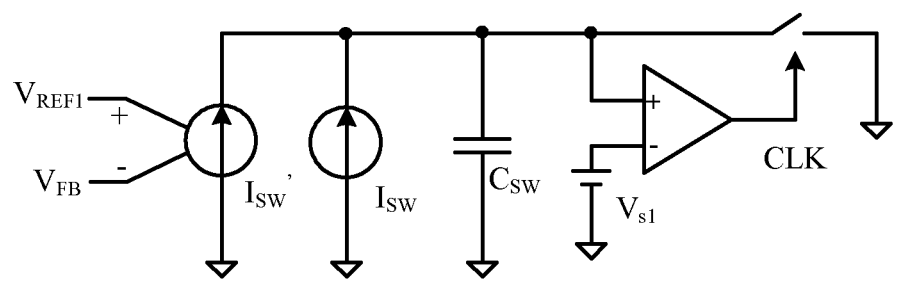
FIG. 5 is a block diagram of an example switch period regulating circuit in a control circuit, in accordance with embodiments of the present invention.

Referring now to FIG. 5, shown is a block diagram of an example switch period regulating circuit in a control circuit, in accordance with embodiments of the present invention. In this example, the switch period regulating circuit can include a voltage controlled current source to change the value and/or direction of the output current according to an error between output voltage feedback signal $V_{FB}$ and reference voltage $V_{REF1}$. This can change the time or slope of the voltage of capacitor $C_{SW}$ rising to a level of voltage source $V_{S1}$. When output voltage feedback signal $V_{FB}$ is greater than reference voltage $V_{REF1}$, the voltage rising speed or slope of capacitor $C_{SW}$ can be slower, and as a result, the period of clock signal CLK can be longer.

However, when output voltage feedback signal $V_{FB}$ is less than reference voltage $V_{REF1}$, the voltage rising speed of capacitor $C_{SW}$ can be increased. As a result, the period of clock signal CLK can be shorter, so as to control the switch period of switch $Q_1$ changing along with output voltage feedback signal $V_{FB}$. Therefore, when the load changes suddenly in a transient or dynamic response situation, the time before the next clock signal arrives can be accordingly reduced or increased. Thus, output voltage $V_{out}$ may not excessively change in this situation, and due to the changing of the switch frequency as a dynamic procedure, there may be sufficient steady margin when the bandwidth is so improved during the dynamic procedure. In this way, a smooth transition between the first (steady operation) and second (dynamic response) operation states can be achieved.

In one embodiment, a method of controlling a switch mode power supply, can include: (i) generating a compensation signal according to an error between an output voltage feedback signal and a first reference voltage of the switch mode power supply; (ii) controlling a switching operation of a power switching device of the switch mode power supply according to the compensation signal; (iii) detecting an operation state of the switch mode power supply according to the output voltage feedback signal; and (iv) regulating a loop gain according to the operation state of the switch mode power supply.

Figure 6:
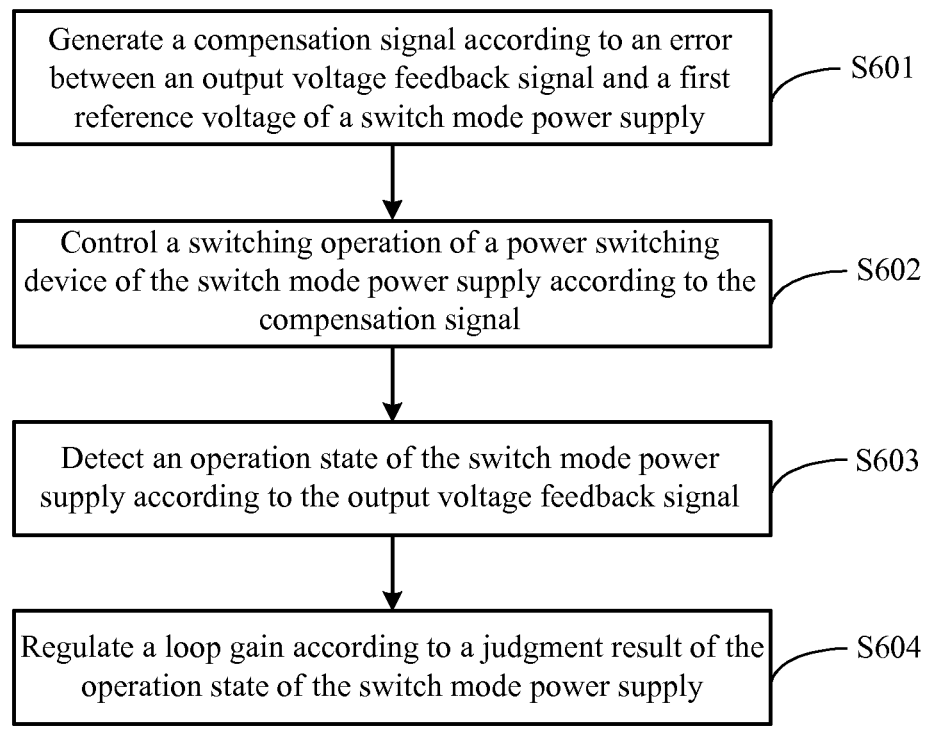
FIG. 6 is a flow diagram of an example control method in accordance with embodiments of the present invention.

The following can describe a fast response control method that can be used to control a switch mode power supply in accordance with embodiments of the present invention. Referring now to FIG. 6, shown is a flow diagram of a first example control method in accordance with embodiments of the present invention. In this example, at S601 a compensation signal can be generated (e.g., via compensation signal generating circuit 201) according to an error between an output voltage feedback signal (e.g., $V_{FB}$) and a first reference voltage (e.g., $V_{REF1}$) of the switch mode power supply.

At S602, a switching operation of a power switching device of the switch mode power supply can be controlled (e.g., via switching signal generating circuit 202) according to the compensation signal (e.g., $V_{COMP}$). At S603, an operation state of the switch mode power supply can be detected (e.g., via judge circuit 203) according to the output voltage feedback signal. At S604, a loop gain can be regulated (e.g., via loop gain regulating circuit 204) according to the operation state (e.g., steady operation state or dynamic response state) of the switch mode power supply.

For example, S603 for detecting the operation state of the switch mode power supply, can further include receiving the output voltage feedback signal, a first threshold signal that is greater than the first reference voltage, and a second threshold signal that is less than the first reference voltage. When the output voltage feedback signal is in the voltage interval between the first and second threshold signals, the switch mode power supply can be detected as operating in the first operation state (e.g., the steady operation state). When the output voltage feedback signal is greater than the first threshold signal or less than the second threshold signal, the switch mode power supply can be detected as operating in the second operation state (e.g., the dynamic response state). In addition, S604 can include regulating the loop gain by changing the gain of the compensation signal generating circuit. Furthermore, the above-described control method can include controlling the switch period to change along with the output voltage feedback signal (see, e.g., FIG. 5).

Figure 7:
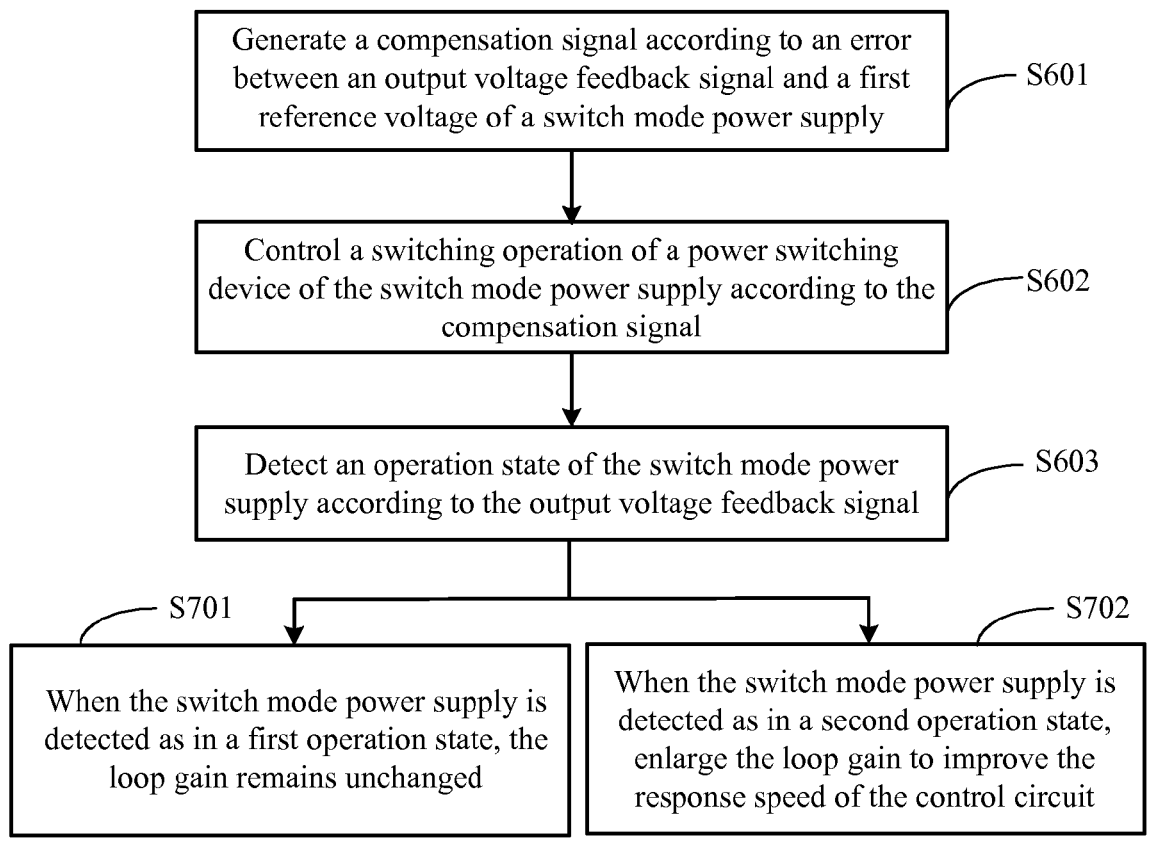
FIG. 7 is a flow diagram of another example control method in accordance with embodiments of the present invention.

Referring now to FIG. 7, shown is a flow diagram of a second example control method in accordance with embodiments of the present invention, which further adds the following based on S604 for regulating the loop gain according to the judgment result or detected operation state, as shown in FIG. 6. At S701, when the switch mode power supply is detected as operating in a first operation state, the loop gain can remain unchanged (e.g., not affected by loop gain regulating circuit 204). At S702, when the switch mode power supply is detected as operating in a second operation state, the loop gain can be increased (e.g., by the gain regulating circuit 204) to improve the dynamic response speed of the control circuit.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A control circuit configured to control a switch mode power supply, said control circuit comprising:
   a) a compensation signal generating circuit configured to generate a compensation signal according to an error between an output voltage feedback signal and a first reference voltage of said switch mode power supply;
   b) a switching signal generating circuit configured to control a switching operation of a power switching device of said switch mode power supply according to said compensation signal;
   c) a judge circuit configured to determine an operation state of said switch mode power supply according to said output voltage feedback signal, wherein said judge circuit comprises a first comparator configured to receive a first threshold signal, a second comparator configured to receive a second threshold signal, a first diode having an anode coupled to an output of said first comparator, a second diode having an anode coupled to an output of said second comparator, a first resistor coupled between a cathode of said first diode and ground, and a second resistor coupled between a cathode of said second diode and ground; and
   d) a loop gain regulating circuit configured to regulate a loop gain of said control circuit according to said operation state.

2. The control circuit of claim 1, wherein:
   a) said loop gain regulating circuit is configured to be disabled when said judge circuit detects that said switch mode power supply is operating in a first operation state; and
   b) said loop gain regulating circuit is configured to increase said loop gain to improve a response speed of said control circuit when said judge circuit detects that said switch mode power supply is operating in a second operation state.

3. The control circuit of claim 2, wherein:
   a) said first threshold signal is greater than said first reference voltage, and said second threshold signal is less than said first reference voltage;
   b) when said output voltage feedback signal is in an interval formed by said first and second threshold signals, said judge circuit is configured to detect said switch mode power supply as operating in said first operation state; and
   c) when said output voltage feedback signal is greater than said first threshold signal or less than said second threshold signal, said judge circuit is configured to detect said switch mode power supply as operating in said second operation state.

4. The control circuit of claim 2, wherein:
   a) said first operation state comprises a steady operation state; and
   b) said second operation state comprises a dynamic response state.

5. The control circuit of claim 1, wherein said loop gain regulating circuit is configured to regulate said loop gain by changing a gain of said compensation signal generating circuit.

6. The control circuit of claim 1, further comprising a switch period regulating circuit configured to control a switch period of said power switching device to change along with said output voltage feedback signal.

7. The control circuit of claim 1, wherein:
   a) said first threshold signal is about 102% of said first reference voltage; and
   b) said second threshold signal is about 98% of said first reference voltage.

8. The control circuit of claim 1, wherein said loop gain regulating circuit comprises:
   a) a first transconductance amplifier having an input coupled to said cathode of said first diode; and
   b) a second transconductance amplifier having an input coupled to said cathode of said second diode.

9. The control circuit of claim 1, wherein said judge circuit does not receive said first reference voltage.

10. A method of controlling a switch mode power supply, the method comprising:
    a) generating, by a compensation signal generating circuit, a compensation signal according to an error between an output voltage feedback signal and a first reference voltage of said switch mode power supply;
    b) controlling a switching operation of a power switching device of said switch mode power supply according to said compensation signal;
    c) detecting, by a judge circuit, an operation state of said switch mode power supply according to said output voltage feedback signal, wherein said judge circuit comprises a first comparator configured to receive a first threshold signal, a second comparator configured to receive a second threshold signal, a first diode having an anode coupled to an output of said first comparator, a second diode having an anode coupled to an output of said second comparator, a first resistor coupled between a cathode of said first diode and ground, and a second resistor coupled between a cathode of said second diode and ground; and
    d) regulating, by a loop gain regulating circuit, a loop gain according to said operation state of said switch mode power supply.

11. The method of claim 10, wherein said regulating said loop gain comprises:
    a) said loop gain remaining unchanged when said switch mode power supply is detected as operating in a first operation state; and
    b) increasing said loop gain when said switch mode power supply is detected as operating in a second operation state.

12. The method of claim 11, wherein:
    a) said first threshold signal is greater than said first reference voltage, and said second threshold signal is less than said first reference voltage;
    b) when said output voltage feedback signal is in an interval formed by said first and second threshold signals, detecting said switch mode power supply as operating in said first operation state; and c) when said output voltage feedback signal is greater than said first threshold signal or less than said second threshold signal, detecting said switch mode power supply as operating in said second operation state.

13. The method of claim 11, wherein:

a) said first operation state comprises a steady operation state; and b) said second operation state comprises a dynamic response state.

14. The method of claim 10, wherein said regulating said loop gain comprises changing a gain of said compensation signal generating circuit.

15. The method of claim 10, further comprising controlling a switch period of said power switching device to change along with said output voltage feedback signal.

16. The method of claim 10, wherein:

a) said first threshold signal is about 102% of said first reference voltage; and b) said second threshold signal is about 98% of said first reference voltage.

17. The method of claim 10, wherein said loop gain regulating circuit comprises:

a) a first transconductance amplifier having an input coupled to said cathode of said first diode; and b) a second transconductance amplifier having an input coupled to said cathode of said second diode.

18. The method of claim 10, wherein said judge circuit does not receive said first reference voltage.

\* \* \* \* \*